United States Patent
Koike

(10) Patent No.: US 8,363,944 B2
(45) Date of Patent: Jan. 29, 2013

(54) READING A PRINT IMAGE INCLUDING DOCUMENT AND CODE IMAGE FOR SIGNATURE VERIFICATION

(75) Inventor: Masamichi Koike, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 904 days.

(21) Appl. No.: 12/196,964

(22) Filed: Aug. 22, 2008

(65) Prior Publication Data

US 2009/0185713 A1     Jul. 23, 2009

(30) Foreign Application Priority Data

Jan. 18, 2008  (JP) .................. 2008-009480

(51) Int. Cl.
*G06K 9/00* (2006.01)
(52) U.S. Cl. ..................... 382/181
(58) Field of Classification Search .......... 382/181
See application file for complete search history.

(56) References Cited

U.S. PATENT DOCUMENTS

| | | | |
|---|---|---|---|
| 6,996,546 B1* | 2/2006 | Giles et al. ............. 705/60 |
| 7,024,558 B1 | 4/2006 | Satake | |
| 2005/0288938 A1* | 12/2005 | Date et al. ............. 705/1 |
| 2006/0198526 A1* | 9/2006 | Saito ............. 380/287 |
| 2007/0019222 A1* | 1/2007 | Oda et al. ............. 358/1.13 |
| 2007/0152058 A1* | 7/2007 | Yeakley et al. ......... 235/462.01 |
| 2007/0177218 A1* | 8/2007 | Sugawara et al. ........... 358/296 |
| 2007/0188823 A1* | 8/2007 | Koide ............. 358/448 |
| 2007/0199990 A1 | 8/2007 | Sonoda | |
| 2007/0211288 A1* | 9/2007 | Uejo et al. ............ 358/1.16 |

FOREIGN PATENT DOCUMENTS

| | | |
|---|---|---|
| EP | 0 982 927 A1 | 3/2000 |
| JP | 2000-78125 A | 3/2000 |
| JP | 2001-157024 A | 6/2001 |
| JP | 2004-45607 A | 2/2004 |
| JP | 2005-142970 A | 6/2005 |
| JP | 2007-226678 A | 9/2007 |

OTHER PUBLICATIONS

Chinese Office Action dated May 11, 2010 in Chinese application No. 200810161315.9.

* cited by examiner

*Primary Examiner* — David Zarka
(74) *Attorney, Agent, or Firm* — Sughrue Mion, PLLC

(57) ABSTRACT

An information processing system includes a signature apparatus and a signature verification apparatus which may be provided separately. The signature apparatus includes a document image generating unit and a print image generating unit. The document image generating unit generates a document image to be signed including document image data and error correction data for character images contained in the document image data. The print image generating unit synthesizes the document image and a code image to generate a print image. The signature verification apparatus includes a restoring unit that restores, from a print image, document image data included in a document image to be signed, using error correction data contained in the document image, and a signature verification unit that performs signature verification using the restored document image data and document image data included in a document image to be signed extracted from the print image.

9 Claims, 16 Drawing Sheets

Certificate of Compliance October 1, 2007
We certify that the following product has passed the safety standards required by the association.
XXX Co., Ltd. Product Name YYYYYYYY

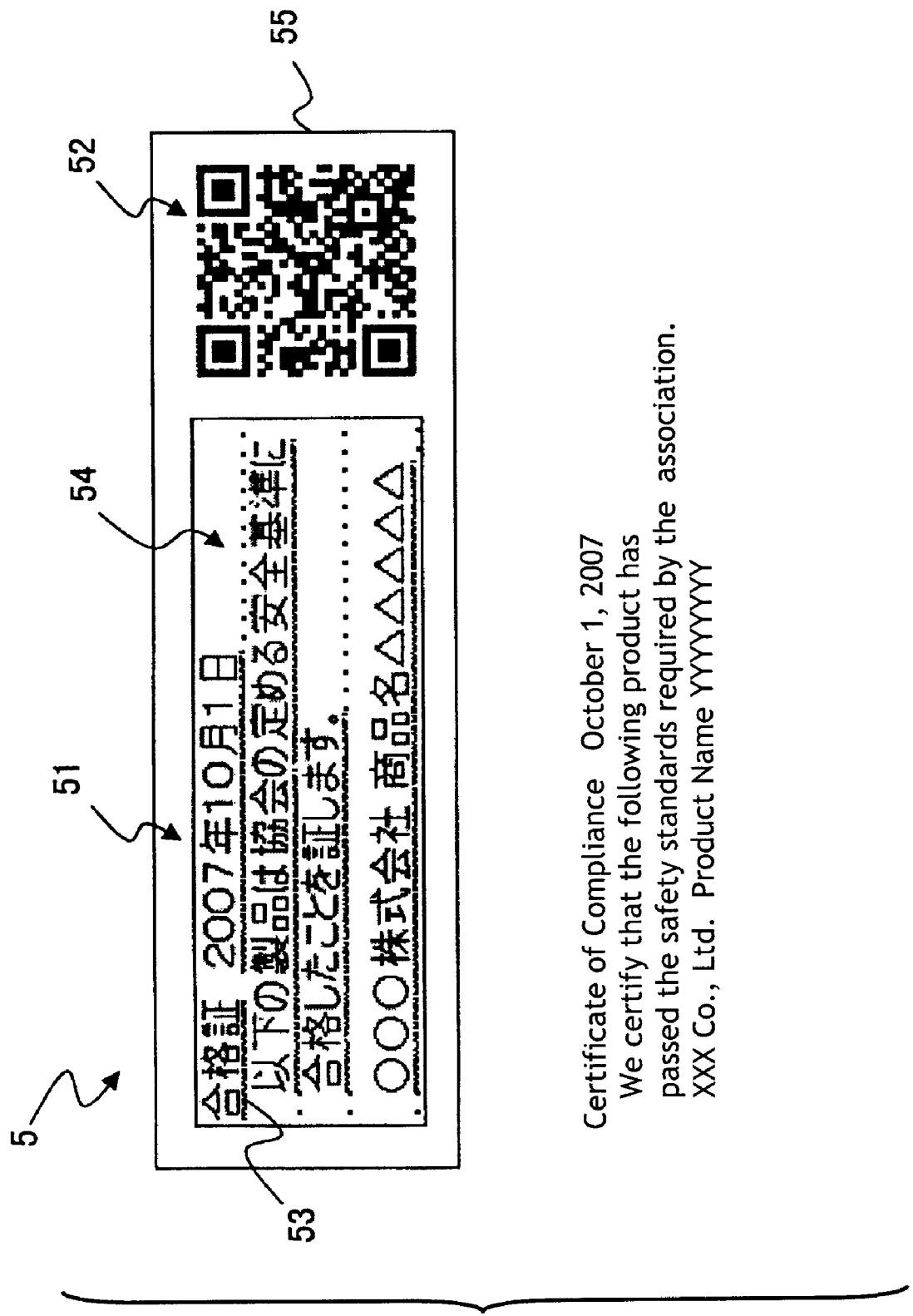

5A: Company Name: XXX Co., Ltd.
Product Code: ABC-0123
Serial Number: 123456

5B: Class A Accuracy Test Conforming Product
Product Code: ABC-0123

5C: Certificate of Compliance with Safety Standard
Product Code: ABC-0123

5D: This product passed hazardous material test.
Product Code: ABC-0123
Serial Number: 123456

READING A PRINT IMAGE INCLUDING DOCUMENT AND CODE IMAGE FOR SIGNATURE VERIFICATION

CROSS-REFERENCE TO RELATED APPLICATIONS

This application is based on and claims priority under 35 USC 119 from Japanese Patent Application No. 2008-9480 filed Jan. 18, 2008.

1. TECHNICAL FIELD

The invention relates to an information processing apparatus, an information processing system, an information processing method, a computer-readable medium and a computer data signal.

2. RELATED ART

In order to detect falsification of documents, it is general to use digital signatures. When information about a document to be signed and a signature of the document is printed on a medium such as a sheet of paper, the information is normally converted into code data such as a QR code before it is printed, and then printed. In this case, contents of the document are held in such a state that the contents cannot be confirmed until signature verification is performed for the document. Thus, if the document is printed together with the coded data in such a manner that the printed document is in a visually confirmable state, the contents of the document can be confirmed even before the signature verification. This situation may be convenient.

SUMMARY

According to an aspect of the invention, an information processing apparatus includes an image data generating unit, a document image generating unit, a signature generating unit, a code image generating unit and a print image generating unit. The image data generating unit generates visually confirmable document image data based on an electronic document to be signed. The document image generating unit generates a document image to be signed including the document image data and error correction data for respective character images contained in the document image data. The signature generating unit generates a digital signature of the document image to be signed. The code image generating unit generates a code image based on information relating to the document image to be signed and document-related information including the digital signature of the document image to be signed. The print image generating unit synthesizes the document image to be signed and the code image to generate a print image.

BRIEF DESCRIPTION OF THE DRAWINGS

Exemplary embodiments of the invention will be described in detail based on the following figures, wherein:

FIG. 8 is a view showing an example in which a certificate image generated by the signature apparatus according to this exemplary embodiment is printed on a sheet of paper;

DETAILED DESCRIPTION

Now, description will be given below on exemplary embodiments of the invention with reference to the accompanying drawings.

Figure 1:
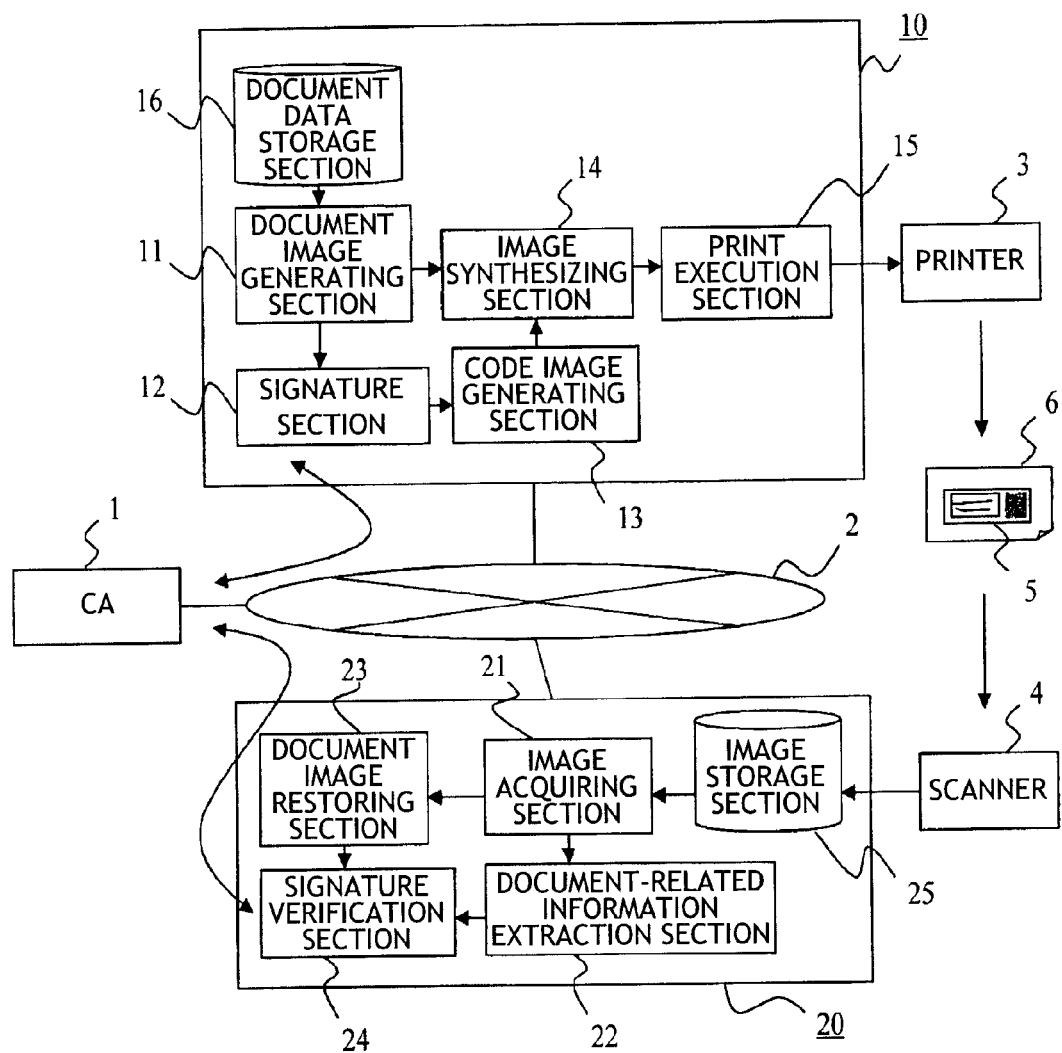
FIG. 1 is a block diagram showing the configuration of an information processing system according to one exemplary embodiment of the invention.

FIG. 1 is a block diagram showing the configuration of an information processing system according to one exemplary embodiment of the invention. FIG. 1 shows a certification authority (CA) 1, a network 2, a printer 3 and a scanner 4 as well as a signature apparatus 10 and a signature verification apparatus 20 which constitute a digital signature system. The certification authority 1 issues a digital certificate for certifying that a public key is authentic. The network 2 connects the certification authority 1, the signature apparatus 10 and the signature verification apparatus 20 to each other. The printer 3 prints a document and/or an image on a sheet of paper 6 according to a command from the signature apparatus 10. The scanner 4 reads the sheet 6 according to a command from the signature verification apparatus 20.

Figure 2:
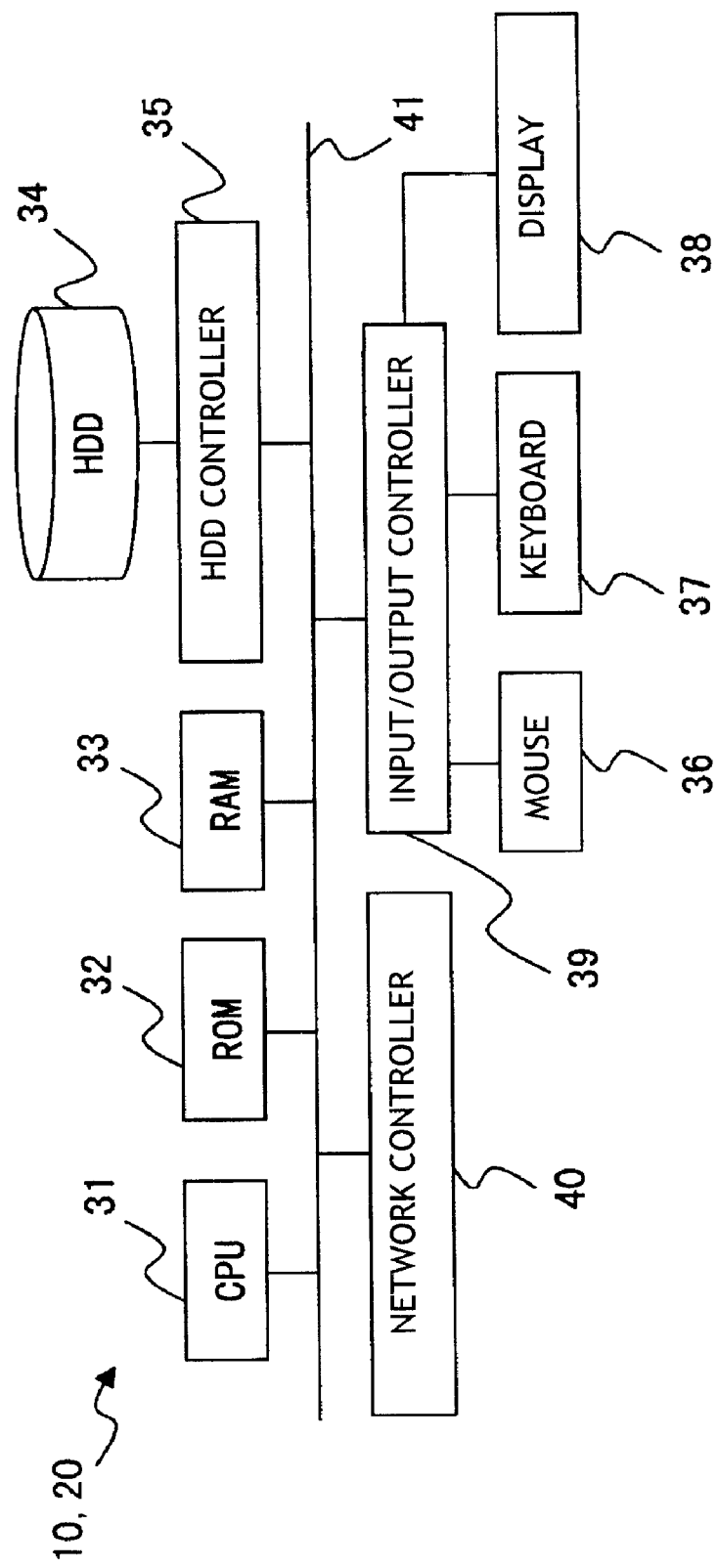
FIG. 2 is a hardware configuration diagram of computers that respectively constitute a signature apparatus and a signature verification apparatus according to the exemplary embodiment.

FIG. 2 is a hardware configuration diagram of computers that respectively constitute the signature apparatus 10 and the signature verification apparatus 20 according to this exemplary embodiment. A server computer may be implemented by a already-existing general purpose hardware structure. That is, the computer may be configured so that, as shown in FIG. 2, connected to an internal bus 41 are a CPU 31, a ROM 32, a RAM 33, a HDD controller 35 with a hard disk drive (HDD) 34 being connected thereto, an input/output controller 39 to which a mouse 36 and a keyboard 37 serving as an input device are connected and also a display 38 serving as a display device is connected, and a network controller 40 serving as a communicating device. The computers respectively constituting the signature apparatus 10 and the signature verification apparatus 20 can be illustrated in the same manner as shown in FIG. 2, even though they may be different in performance. In this exemplary embodiment, it is assumed that the computer is implemented by a personal computer (PC).

Referring back to FIG. 1, the signature apparatus 10 includes a document image generating section 11, a signature section 12, a code image generating section 13, an image synthesizing section 14, a print execution section 15 and a document data storage section 16. Specifically, the document image generating section 11 generates visually confirmable document image data based on an electronic document acquired from the document data storage section 16 or a document input by a user. Also, the document image generation section 11 generates wrong recognition prevention information (error correction data) for respective character images contained in the document image data. Then, the document image generation section 11 generates a document image to be signed, which includes the document image data and the wrong recognition prevention information for the respective characters. The signature section 12 generates a digital signature of the document image to be signed. The code image generating section 13 encodes information relating to the document image to be signed generated by the document image generation section 11 and document-related information, which includes the digital signature of the document image to be signed generated by the signature section 12, so as to generate a visually confirmable code image. The image synthesizing section 14 synthesizes the document image to be signed generated by the document image generating section 11 and the code image generated by the code image generating section 13 to generate a print image. The print execution section 15 sends a print command to the printer 3 to print the print image. The document data storage section 16 stores therein an electronic document which is original data of document data to be signed.

Also, the signature verification apparatus 20 includes an image acquiring section 21, a document-related information extraction section 22, a document image restoring section 23, a signature verification section 24 and an image storage section 25. A print image 5 read by the scanner 4 are stored once in the image storage section 25. Then, the image acquiring section 21 reads out the print image 5 from the image storage section 25. The document-related information extraction section 22 extracts, from a code image contained in the print image 5, the information relating to the document image to be signed and the document-related information including the digital signature of the document image to be signed. The document image restoring section 23 restores the document image data contained in the document image to be signed using the wrong recognition prevention information contained in the document image to be signed. The signature verification section 24 performs signature verification using the document image data restored by the document image restoring section 23 and the document image data contained in the document image to be signed extracted by the document-related information extraction section 22.

The constituent elements 11 to 15 of the signature apparatus 10 and the constituent elements 21 to 24 of the signature verification apparatus 20 are implemented by coordinated operations performed by the computers constituting the signature apparatus 10 and signature verification apparatus 20 and programs which run on the CPUs 31 mounted on the respective computers. Also, the document data storage section 16 is implemented by an external storage device which is mounted on the signature apparatus 10.

Also, the programs used in this exemplary embodiment can be provided not only by a communication device but also in a state where the programs are stored in a computer-readable recording medium such as a CD-ROM or a DVD-ROM. The programs, which are provided from the communication device or the recording medium, are installed into the computer and then, the CPU 31 of the computer 31 executes the thus installed programs sequentially, to realize various processes.

Figure 3:
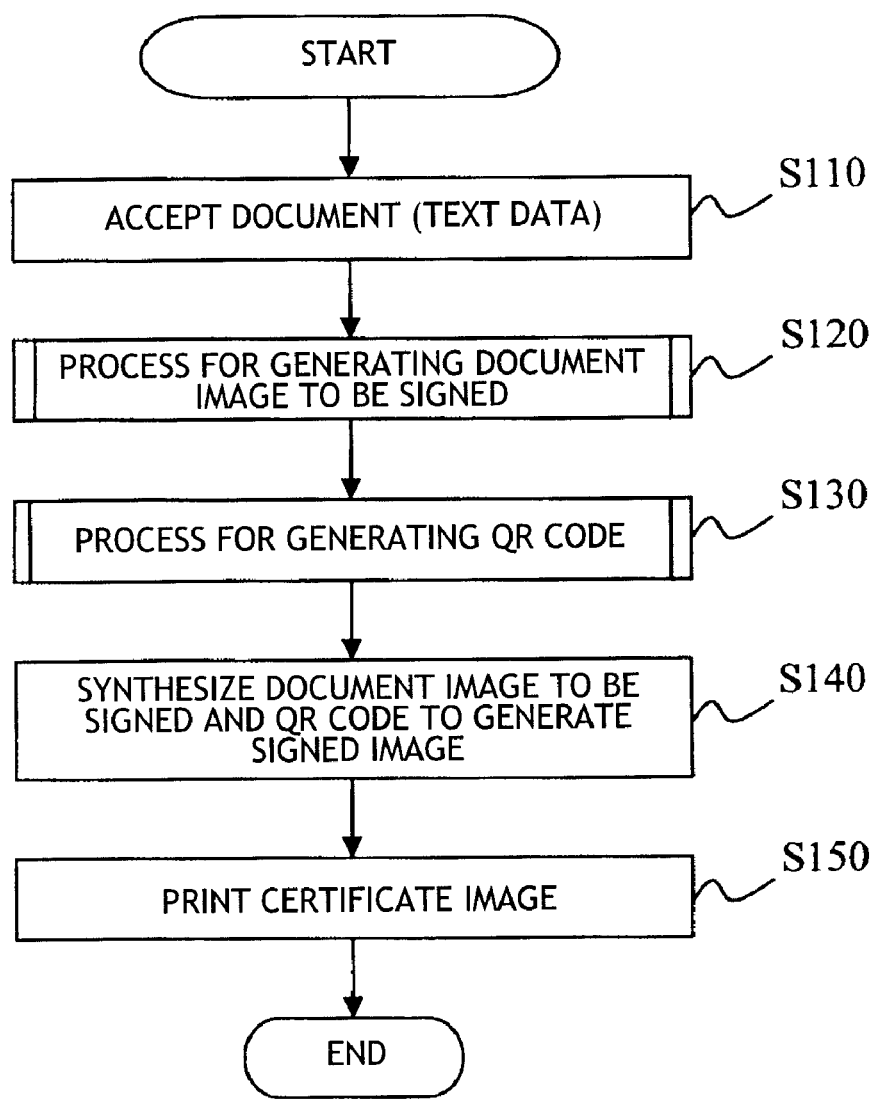
FIG. 3 is a flow chart of a signing process according to the exemplary embodiment.

Next, description will be given below on a signing process that is executed by the signature apparatus 10 according to this exemplary embodiment, with reference to flow charts shown in FIGS. 3 to 5. This signing process finally generates a certificate image 5 shown in FIG. 7B.

Figure 6:
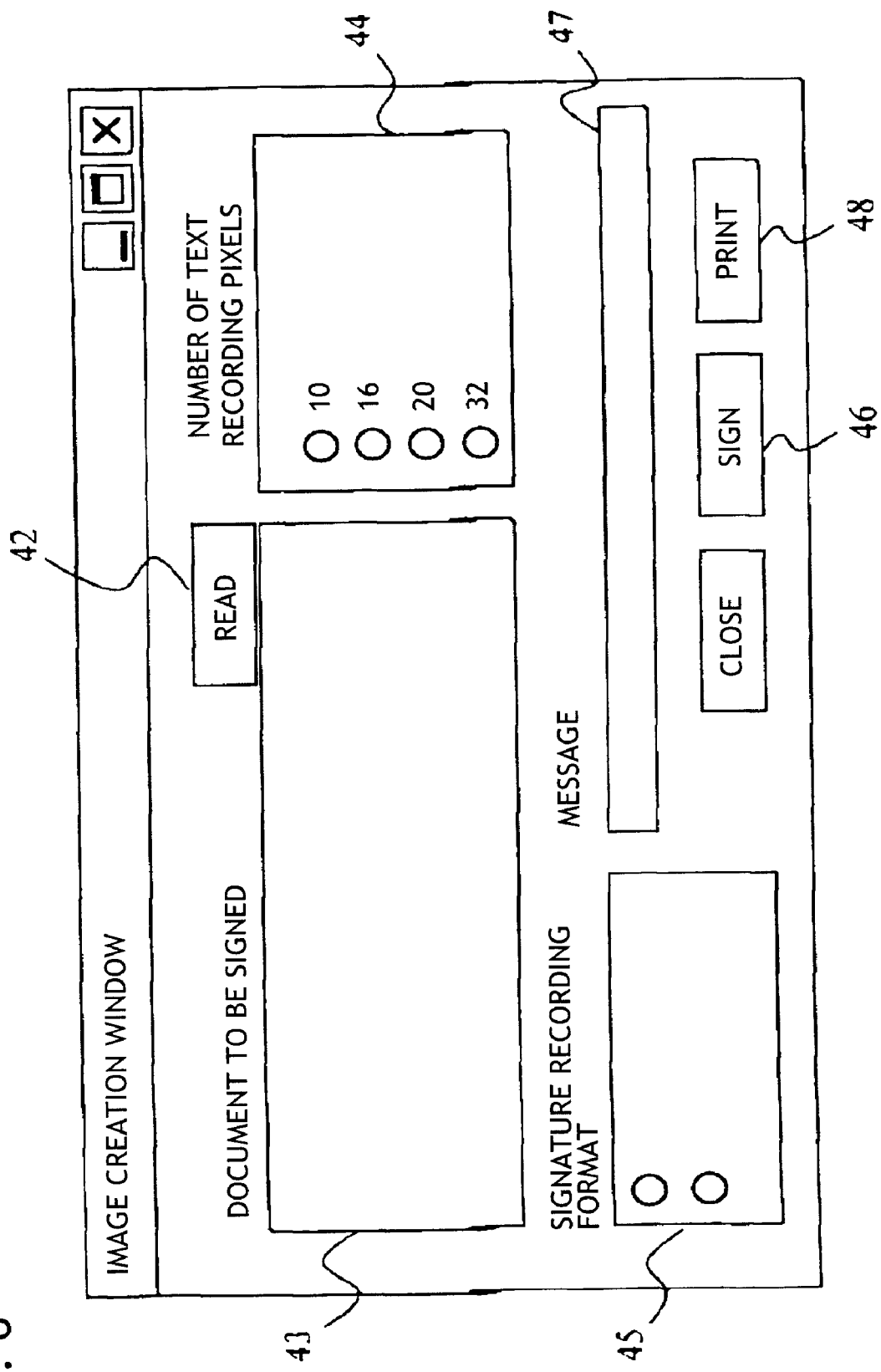
FIG. 6 is a view showing an example of an image creation window used in the exemplary embodiment.

FIG. 6 is a view showing an example of an image creation window used in this exemplary embodiment. A user, who wants to signs a document, displays this window on the display 38 and specifies a document to be signed (a signature target document), the number of pixels and a signature recording format. When an electronic document stored in the document data storage section 16 is used as the document to be signed, a read button 42 is selected. In this case, contents of the selected document are displayed in a document display area 43. Also, the user may also input a text message to be signed into the document display area 43. When characters constituting the document to be signed are converted into an image, the number of pixels of the image is specified by selecting any of radio buttons respectively corresponding to the numbers of pixels displayed in a pixel number specifying area 44. Also, in this exemplary embodiment, the signature is converted into code data, and the code data is printed. A type of the code used to form such code data may be specified by selecting any of radio buttons corresponding code types displayed in a format specifying area 45. In the following description, it is assumed that the user selects 16 pixels, that is, 16×16 pixels for a character as the number of text recording pixels, and that the user selects the QR code is selected as the signature recording format. Here, the "QR code" means a two-dimensional code of a matrix type. By the way, although, in this exemplary embodiment, description will be given on the assumption that the coded data is the QR data, the coded data is not limited to the QR data.

When the user sets up necessary information and then selects a "sign" button 46 on the window, the signature apparatus 10 accepts text data that is displayed in the document display area 43 (Step 110). Then, the document image generating section 11 executes a document image generation process according to the following procedures (Step 120). This document image generation process will be described with reference to a flow chart shown in FIG. 4 and FIG. 6.

Figures 7A, 7B:
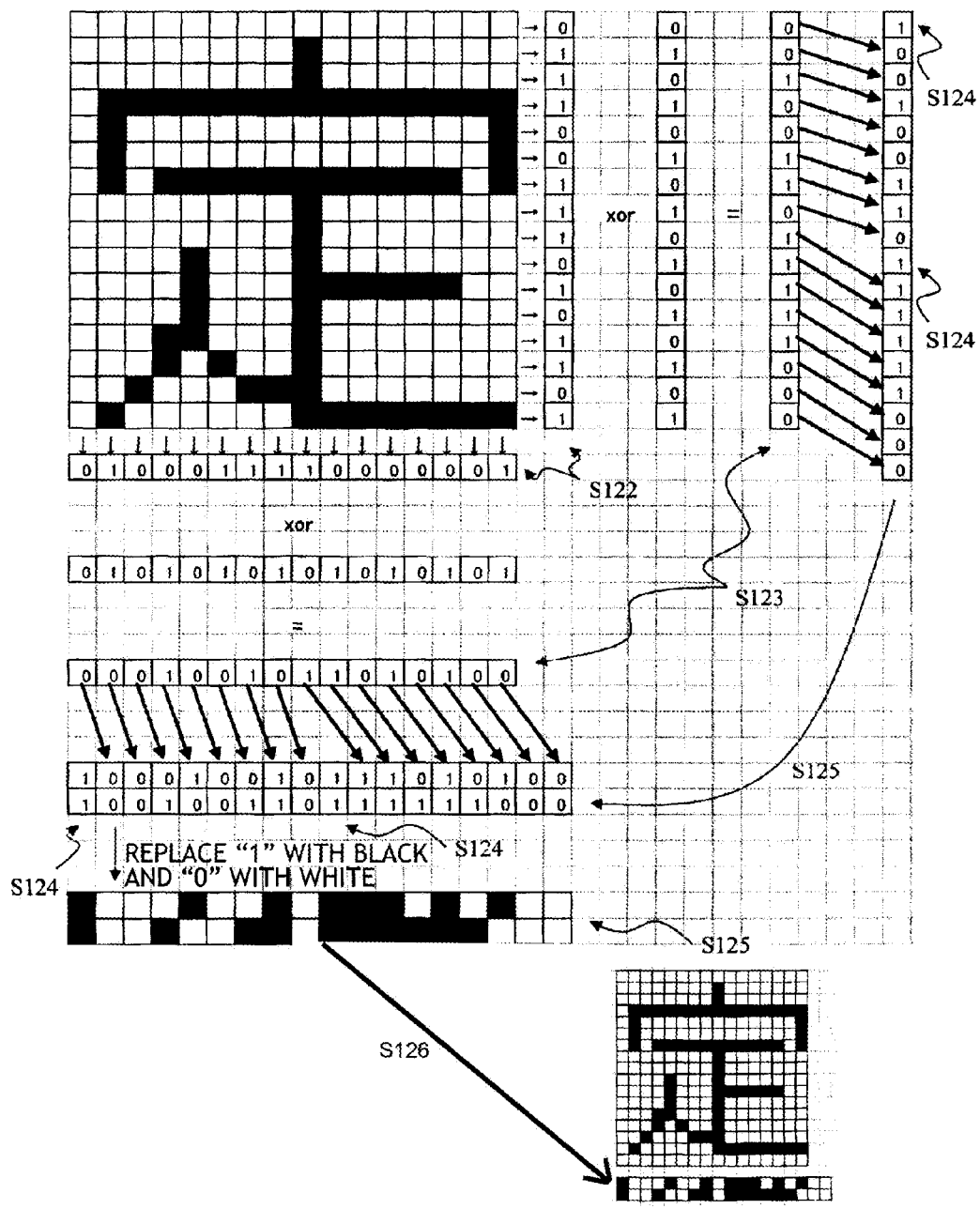
FIG. 7A is a view showing a character example (a Kanji character) for which a procedure shown in FIG. 7B is applied.
FIG. 7B is a conceptual view for explaining the procedure for generating the document image to be signed according to this exemplary embodiment.

In FIG. 7B, a kanji character shown in FIG. 7A is used as an example. It should be noted that although this exemplary embodiment will be described with reference to the kanji character shown in FIG. 7A, the invention can apply not only to Japanese language characters including the Kanji characters, but also any other characters such as alphabetic characters, the simplified Chinese characters or the traditional Chinese characters. The document image generating section 11 converts the text character (shown in FIG. 7A) contained in the document to be signed into bitmap data using a predetermined application, so as to generate image data (Step 121). FIG. 7B shows an example in which the text character is converted into image data having 16×16 pixels according to a user's specification of the pixel number. Then, the document image generating section 11 performs the exclusive OR (XOR) operation for pixels constituting the character image in the row and column directions (Step 122). Thereafter, the document image generating section 11 performs the XOR operation for each operation result and "0" if the operation result is in an odd row or an odd column, and also performs the XOR operation for each operation result and "1" if the operation result is in an even row or an even column (Step 123). With these processes, 16-pixel strings are generated in the row and column. Furthermore, "1" is inserted into a head and a center of each pixel string (Step 124). As a result, 18-pixel strings are generated in the row and column. Then, in this exemplary embodiment, the operation result for the row is moved below the operation result for the column. Also, while "0" contained in the operation results is set to be white, "1" contained in the operation results is set to be black, to thereby generate a line pattern (Step 125). Then, the thus generated line pattern is positioned so that it is printed as the underline of the character image. The above processes are performed for all characters (including blank character) that constitute the document read out from the document display area 43, thereby generating character image information (Step 126).

FIG. 8 shows an example in which the certificate image 5 generated by the signature apparatus 10 of this exemplary embodiment is printed on a sheet of paper. While the signature apparatus 10 of this exemplary embodiment generates the certificate image 5 shown in FIG. 8 as a print image, the certificate image 5 contains a document image to be signed 51 and a QR code 52. Of these constituent elements, the document image to be signed 51, as described above, is image data which is generated by the document image generating section 11 and which is generated as a visually confirmable document image based on the text data to be signed. The line pattern of each character is incorporated into the image as an underline 53 of the corresponding character image. Each line pattern serves as error correction data which is used when the signature verification apparatus 20 performs signature verification and which is recorded into the image as the wrong recognition preventive information for the corresponding character. In the step 124, since "1" is inserted into the heads and centers of the respective pixel strings in the row and column so that the heads and centers of the respective pixel strings in the row and column are printed with black, only black points 54 are printed below blank character portions.

It is noted that if the text data contained in the document image to be signed 51 shown in FIG. 8 is translated into another language (e.g., English or Chinese), line patterns different from those shown in FIG. 8 are generated as can be seen from FIG. 7B. Therefore, in this specification, the text data contained in the document image to be signed 51 is written in Japanese as they are. Also, FIG. 8 shows an English translation of the text data contained in the document image to be signed 51 below the example of the certification image 5.

After the character image information is generated as described above, the code image generating section 13 generates the QR code in the following manner (Step 130). That is, in FIG. 5, the code image generating section 13 generates a digest of the character image information using a predetermined digest function and encrypts (electronically signs) the digest using a secret key that is prepare in advance so as to generate a digital signature (Step 131).

Then, the code image generating section 13 collects the following information that relate to the signature, as information to be converted into code data (Step 132). That is, firstly, the code image generating section 13 obtains a public key certificate necessary for signature verification. Alternatively, in order to reduce the quantity of information to be converted into the code data, the code image generating section 13 may not store the certificate itself but may store, as information for specifying the certificate, information for specifying a storage location of the certificate such as a URL (Uniform Resource Locator) so as to enable the signature verification apparatus 20 to obtain the public key certificate. Also, the code image generating section 13 may obtain information for specifying the signature apparatus 10 such as an IP address. Furthermore, the code image generating section 13 may also obtain information for supporting that the signature verification apparatus 20 restores character images contained in the character image information, for example, the number of text recording pixels specified by the user through the image creation window. Still further, if a print position of the certificate image 5 on a sheet of paper is determined previously, the code image generating section 13 may also obtain information for specifying the print position. Also, if this QR code and another QR code are printed on the same sheet of paper, in order to easily distinguish the types of the QR codes, the code image generating section 13 may obtain information showing that this QR code is a QR code to be generated according to this exemplary embodiment, for example, a predetermined sign or message. When the image generating section 13 completes to collect the pieces of information necessary for converting into the coded data, the code image generating section 13 converts these pieces of information and the digital signature into a QR code using a predetermined application software (Step 133).

When the image data including the document image to be signed and the QR code are generated in the above-mentioned manner, the image synthesizing section 14 synthesizes these images to generate the certificate image 5 (Step 140). FIG. 8 shows an example of the synthesis result. In this exemplary embodiment, the certificate image 5 is arranged such that a document image to be signed 51 is printed on the left side of the QR code 52. Also, in this exemplary embodiment, the certificate image 5 is generated in such a manner that the two images 51 and 52 are surrounded by an image frame 55 in order to clearly shows that there is a set of the visually confirmable document image to be signed 51 and the QR code 52 including a visually inconfirmable document image to be signed.

When the generation of the certificate image 5 is completed, the signature apparatus 10 displays a completion message on the message display area 47 of the image creation window. When the user sees the displayed contents in the message display area 47 and confirms the generation of the certificate image 5, the user selects a print button 48.

In response to this button select operation, the print execution section 15 causes the printer 3 to print the certificate image 5 generated by the image synthesizing section 14 (Step 150). In this manner, contents that are signed in a visually confirmable state are printed together with the visually inconfirmable signature. Since the certificate image 5 may only be printed on the sheet 6, the certificate image 5 may be output not from the printer 3 but from an apparatus having a print function, for example, an image processing apparatus such as a multi function machine or a facsimile machine.

Figure 9:
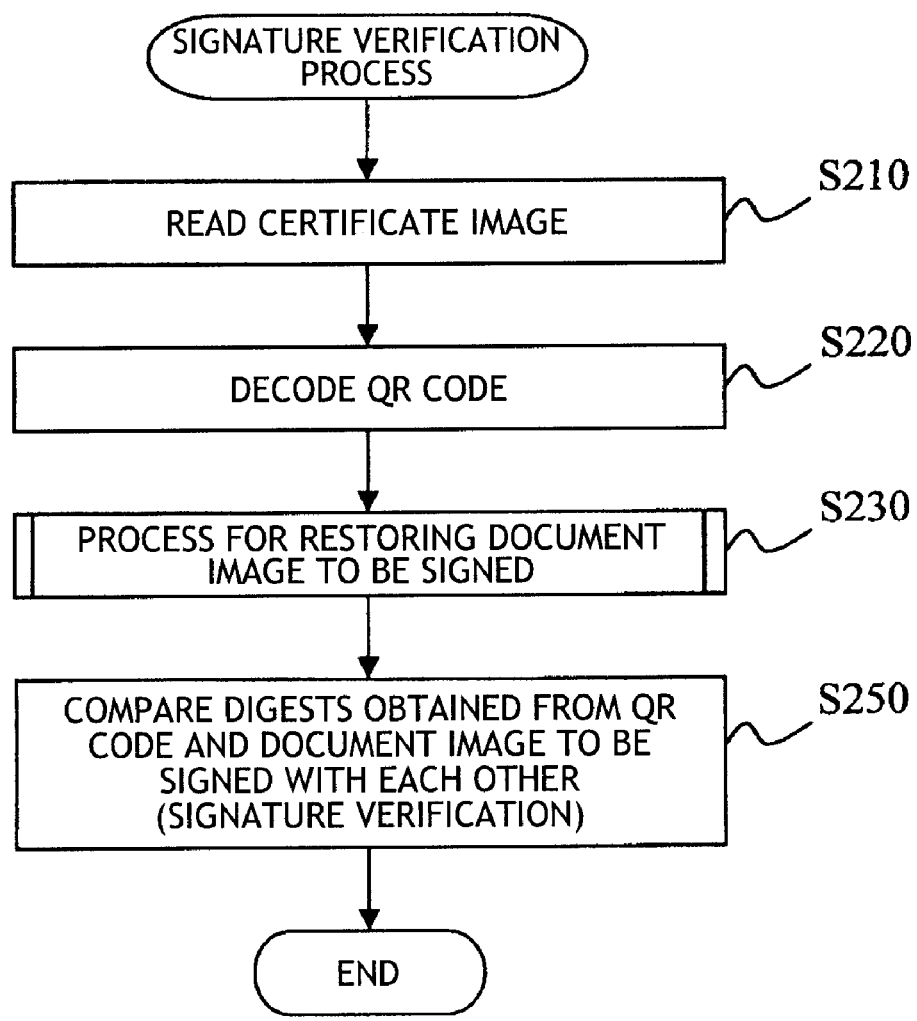
FIG. 9 is a flow chart of a signature verification process according to the exemplary embodiment.
Figure 10A:
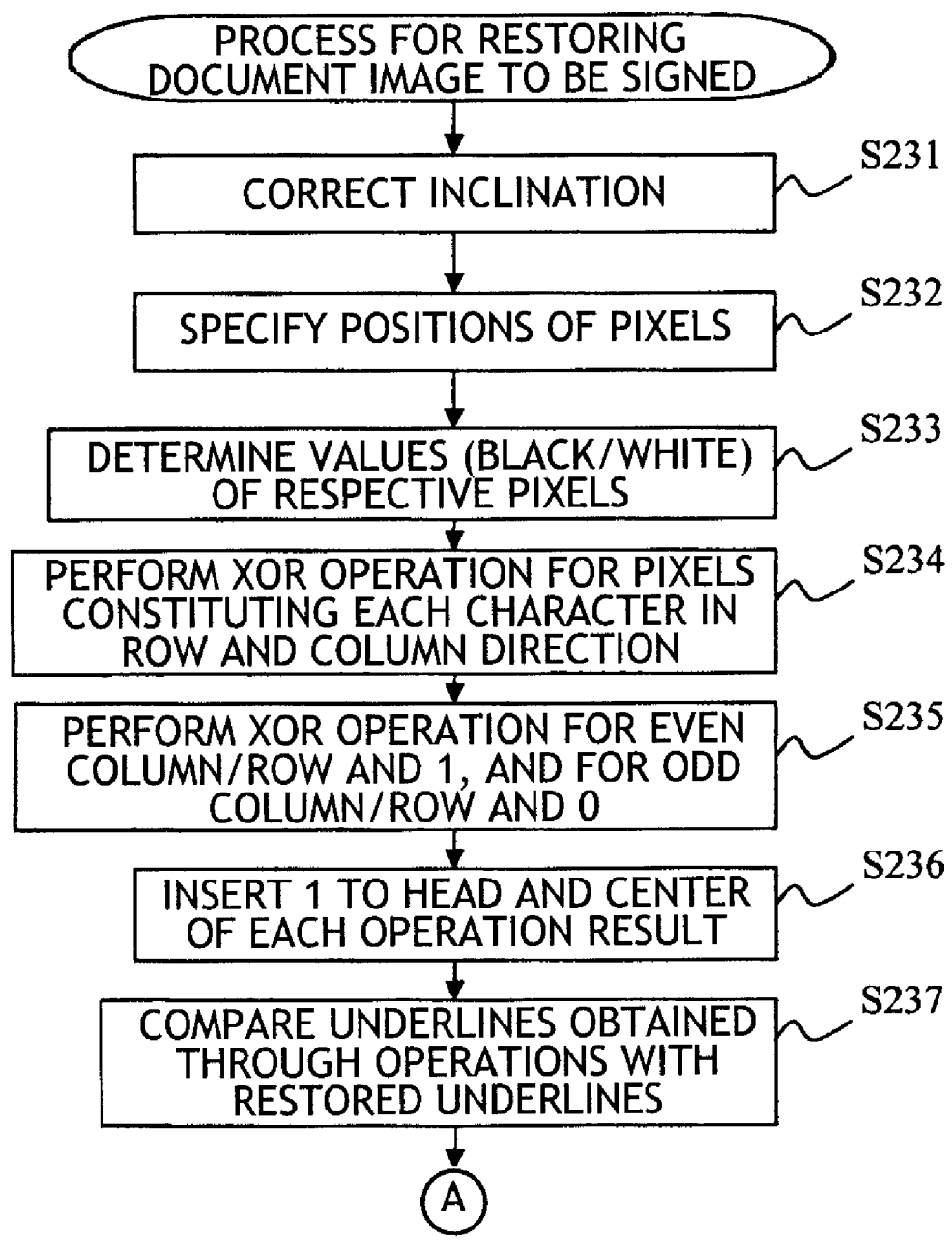
FIGS. 10A and 10B are flow charts of a process for restoring a document image to be signed wherein this process is contained in the signature verification process of the exemplary embodiment.
Figure 10B:
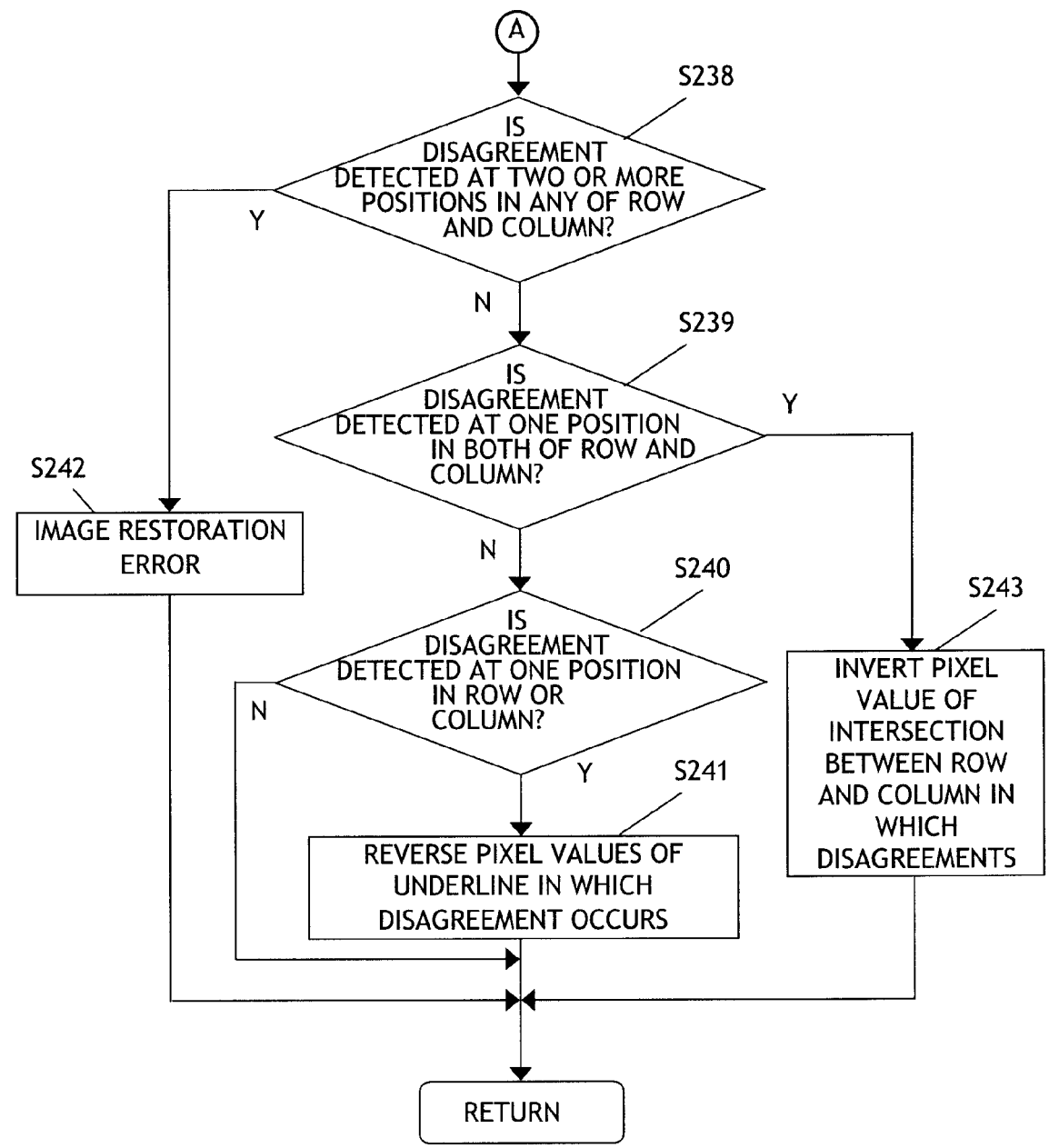

Next, description will be given below on a signature verification process that is performed by the signature verification apparatus 20 of this exemplary embodiment with reference to flow charts shown in FIGS. 9 and 10.

Figure 11:
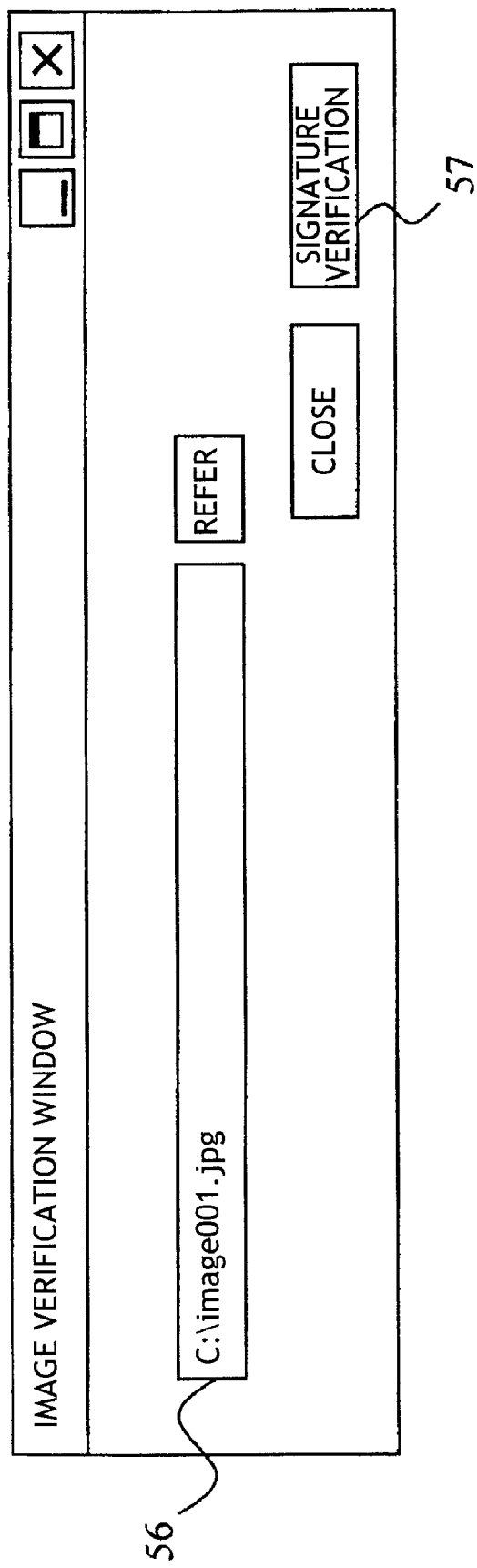
FIG. 11 is a view showing an example of an image verification window according to the exemplary embodiment.

The user reads the sheet 6, on which the certificate image 5 is printed, with the scanner 4 and temporarily stores it in the image storage section 25 with an arbitrary file name. Then, the user performs a predetermined operation to display an image verification window shown in FIG. 11, specifies the temporarily stored file name from a file name specifying area 56 of the image verification window and then, selects a signature verification button 57.

The image acquiring section 21 reads a read image having the specified file name according to the user's select operation (Step 210). In this process, it is assumed that the certificate image 5 printed on the sheet 6 is acquired. Therefore, the certificate image 5 may be acquired with a device other than the scanner 4. For example, the image acquiring section 21 may be configured to acquire an image read by an image processing apparatus having a scanner function. Or, the image acquiring section 21 may be configured to acquire an image photograph with an imaging device such as a digital camera or a cell phone having a camera function.

Next, the document image restoring section 23 restores a document image from the document image to be signed 51 contained in the certificate image 5. This process is carried out in the following manner.

Firstly, the document-related information extraction section 22 decodes the QR code 52 contained in the certificate image 5 using a predetermined application software to restore the information contained in the coded document-related information to a state at which the information can be referred to (Step 220). Specifically the information contained in the coded document-related information includes the signature, the public key certificate (or the information for specifying the certificate) and other information relating to the signature. There may be a case that a QR code other than the QR code 52 contained in the certificate image 5 is printed on the sheet. As described in the step 133 of FIG. 5, whether or not a QR code read is the QR code contained in the certificate image 5 may be determined using the information relating to the type of the QR code. Also, there may be a case that more than one certificate image 5 is printed on the same sheet. This case can be handled in the similar manner. That is, when more than one QR code is printed on the same sheet, the process for determining a type of the QR code is performed On the other hand, the document image restoring section 23 processes the document image to be signed 51 contained in the certificate image 5. As described above, the underlines 53 are added to the character images contained in the document image to be signed 51, and the underlines 53 contain at least the black points 54 for blank character images. Therefore, the document image restoring section 23 corrects an inclination that may occur when the certificate image 5 is read or photographed, with the black points 54 contained in the underlines 53 being used as a reference (Step 231). The black points 54 are arranged so that characters exist just above the black points 54, and in addition, the signature apparatus 10 includes the black points 54 in the document image to be signed 51 for the purpose of correction of an inclination. It is supposed that the inclination, which may occur when the certificate image 5 is read or photographed, occurs rather in every line than in every character image. Therefore, although the signature apparatus 10 inserts the black "1" into the two positions, that is, the heads and centers of the pixel strings each of which is composed of 16 pixels and which are formed in the row and column in Step 124 shown in FIG. 4, it is possible to correct the inclination so long as the black "1" is inserted into at least one position not into two positions even if the position, into which the black "1" is inserted, is not limited to the head or the center. Also, the positions at which the signature apparatus 10 inserts the black "1" in Step 124 shown in FIG. 4, and number of the positions are previously determined, and if the signature verification apparatus 20 recognizes it in advance, the positions for insertion of the black "1" and the number of the positions may be set arbitrarily. Also, in this exemplary embodiment, the black is expressed by "1" and the white is expressed by "0". However, if black for inclination correction is printed in the underlines for the character images, the correspondence of black and white to "0" and "1" may also be reversed.

Next, since the number of pixels of the character images can be obtained from the information that is provided by decoding the QR code 52, the document image restoring section 23 divides the underline 53 by the number of pixels to specify positions of the respective pixels (Step 232). Then, the document image restoring section 23 determines colors of the thus-specified pixels constituting the character images, that is, the black "1" or white "0" (Step 233). By the way, in order to enhance the certainty of this black and white determination, the signature apparatus 10 may set a recording resolution in recording the document image to be signed 51 relatively lower than that in acquiring the image.

Figure 4:
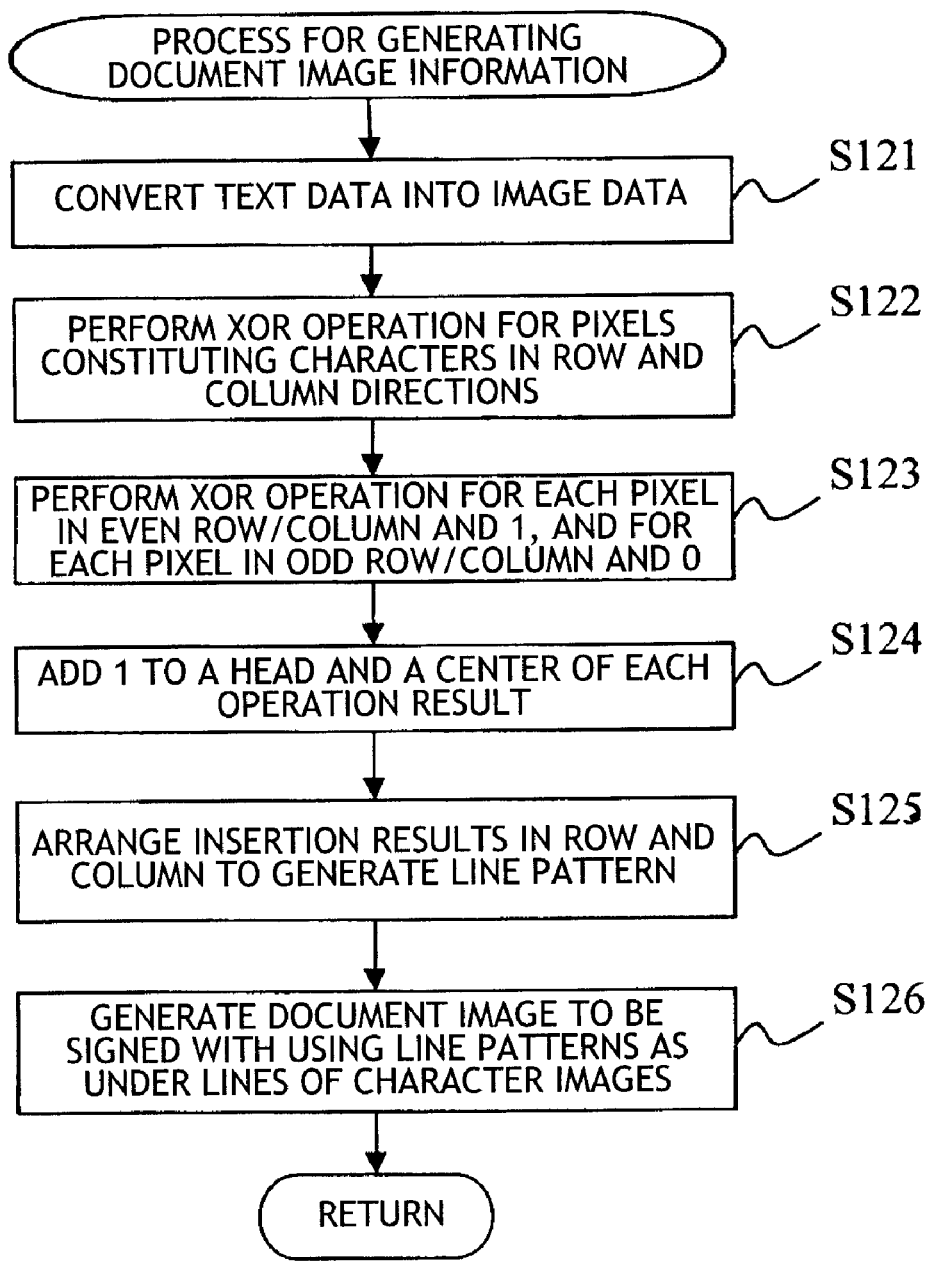
FIG. 4 is a flow chart of a process for generating a document image to be signed according to the exemplary embodiment wherein this process is contained in the signing process.
Figure 5:
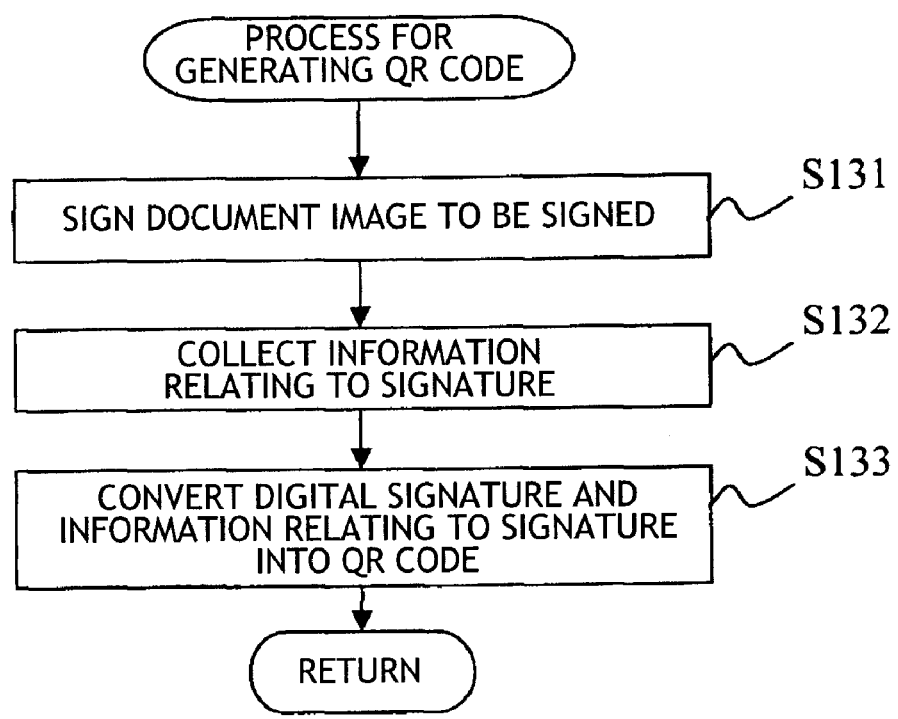
FIG. 5 is a flow chart of a process for generating a QR code according to the exemplary embodiment wherein this process contained in the signing process.

Then, in order to check the validity of the black and white determination results, the document image restoring section 23 performs the processes (in steps 234 to 236) which are the same as those performed in the steps 122 to 124 shown in FIG. 4 for generating the underlines 53. That is, the document image restoring section 23 performs exclusive-OR (XOR) operations for the pixels constituting each character image in the row and column directions (Step 234). The document image restoring section 23 performs the exclusive OR (XOR) operations for odd columns/rows of each operation result and "0" and for even columns/rows of each operation result and "1" (Step 235). Then, the document image restoring section 23 inserts "1" into the fronts and centers of the operation results (16-pixel string in column and 16-pixel strings in row) (Step 236). In this manner, 18-pixel strings in column and row are generated to obtain underlines (line patterns) corresponding to the respective character images. Then, the document image restoring section 23 compares the underline obtained from each character image contained in the certificate image 5 in steps 231 to 236 with the underline 53 contained in the character image information 51 (Step 237). If the comparison result shows that disagreement is detected at two or more positions in any of row and column (in Step 238, Y), it is impossible to perform error correction. Therefore, the document image restoring section 23 determines that the restoration of the character image is impossible, that is, an image restoration error occurs (Step 242). Also, if disagreement is detected only at one position in both of row and column (in Step 239, Y), the document image restoring section 23 determines that the value of a pixel in an intersection between the row and column at which the disagreements is wrong, and inverts the pixel value. Also, if disagreement is detected at one position only in one of the row and column (in Step 240, Y), the document image restoring section 23 determines that a value of a pixel existing on the underline of the row or column at which disagreement occurs is wrong, and inverts the pixel value on the underline portion. If no disagreement is detected, the document image restoring section 23 determines that no error is present.

Figure 12:
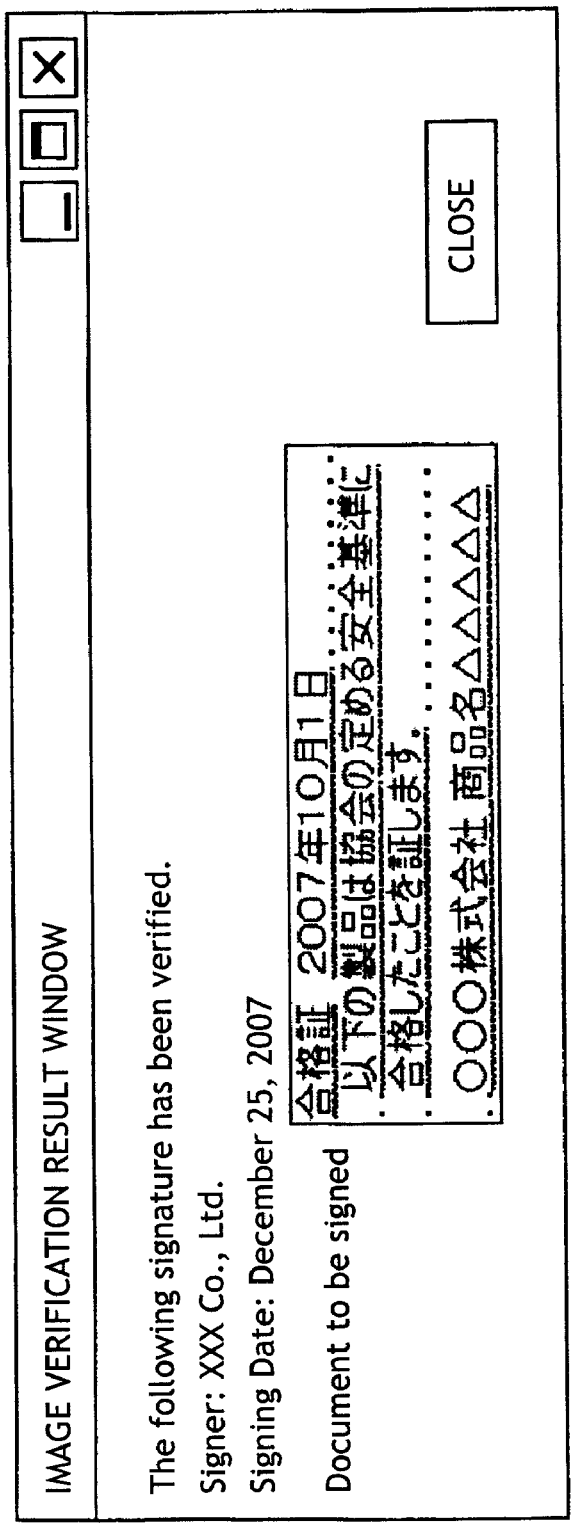
FIG. 12 is a view showing an example of an image verification result window according to the exemplary embodiment.

In the above-mentioned manner, when the document image restoring section 23 restores accurately the read character image information 51, the signature verification section 24 performs a signature verification process in the following manner (Step 250). That is, the signature verification section 24 obtains the public key certificate of a signer from the information extracted in step 220, and confirms authenticity by performing the signature verification using the public key of the public key certificate provided by a certification authority. Then, the signature verification section 24 restores the signature using the public key of the signer to obtain the digest of the character image information. On the other hand, the signature verification section 24 generates the digest of the character image information restored in step 230 using the predetermined digest function, which is used by the code image generating section 13. Then, the signature verification section 24 compares these two digests, which have been obtained by the respective processes, with each other. As a result of this comparison, if they are identical with each other, the signature verification section 24 determines that the document to be signed is the authentic document. On the other hand, if they are not identical, or if the image restoration error occurs in the process for restoring the character image information, the signature verification section 24 determines that the document to be signed is not the authentic document. FIG. 12 shows an example of an image verification result window which is displayed on the display 38 of the signature verification apparatus 20 when the result of the signature verification indicates that the document to be signed is the authentic document. Since the text data of the document to be singed shown in FIG. 12 is the same as that shown in FIG. 8, its English translation is omitted in FIG. 12.

According to this exemplary embodiment, the error correction data of the character image are contained in the character image information 51 as the underlines of the respective character images. However, provided that the character images and error correction data are arranged to correspond to each other, the error correction data may not be contained as the underlines. For example, an error correction data recording area may be provided in the character image information.

Also, in the foregoing description, as a device for acquiring the certificate image 5, an image processing apparatus and a cell phone as well as the scanner 4 may be used. The signature verification apparatus 20 may be implemented by an image processing apparatus incorporating a CPU and a RAM therein, a cell phone, or the like.

Now, description will be given below on a system to which the above-mentioned exemplary embodiment is applied.

Figure 13:
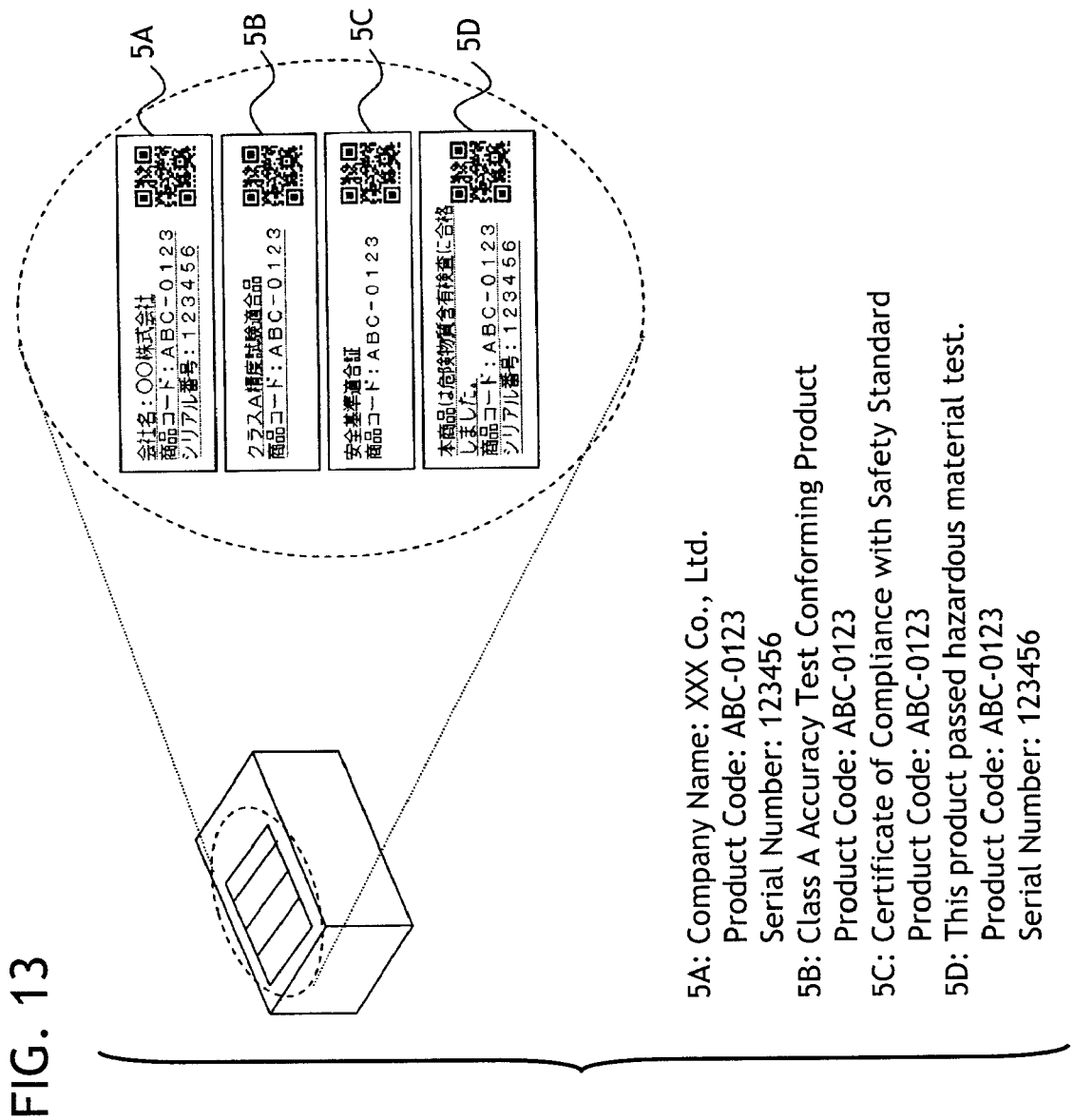
FIG. 13 is a view showing an example in which when a signature system according to this exemplary embodiment is applied to inspection of a product, a certificate image is bonded to a package of the product.

FIG. 13 shows an example in which, when this exemplary embodiment is applied for product inspection, the certificate image 5 generated by the signature apparatus 10 is bonded to a package of the product. For the product, a product supplier may record information containing a product code of the product and/or its serial number with signature, and an inspector may record a result of inspection with signature. In this case, as shown in FIG. 13, two or more certificate images 5 (5A to 5D) are bonded to the product. Thus, since the contents of the inspection results can be visually confirmed, a person who wants to perform the signature verification of the inspection results can find out a certificate image 5 for which the signature verification to be performed, from the two or more certificate images. Then, the signature inspector photographs the certificate image 5 with a digital camera, a camera of a cell phone or the like, and transfers the photographed image data to a computer in which signature verification application software is installed, to perform the signature verification. When a cell phone is used, the signature inspect application software may be installed in the cell phone so that the signature verification can be performed only using the cell phone.

In FIG. 13, text data contained in the certificate images 5A to 5D are written in Japanese, and English translation of them are shown in a lower portion of FIG. 13.

Figure 14A:
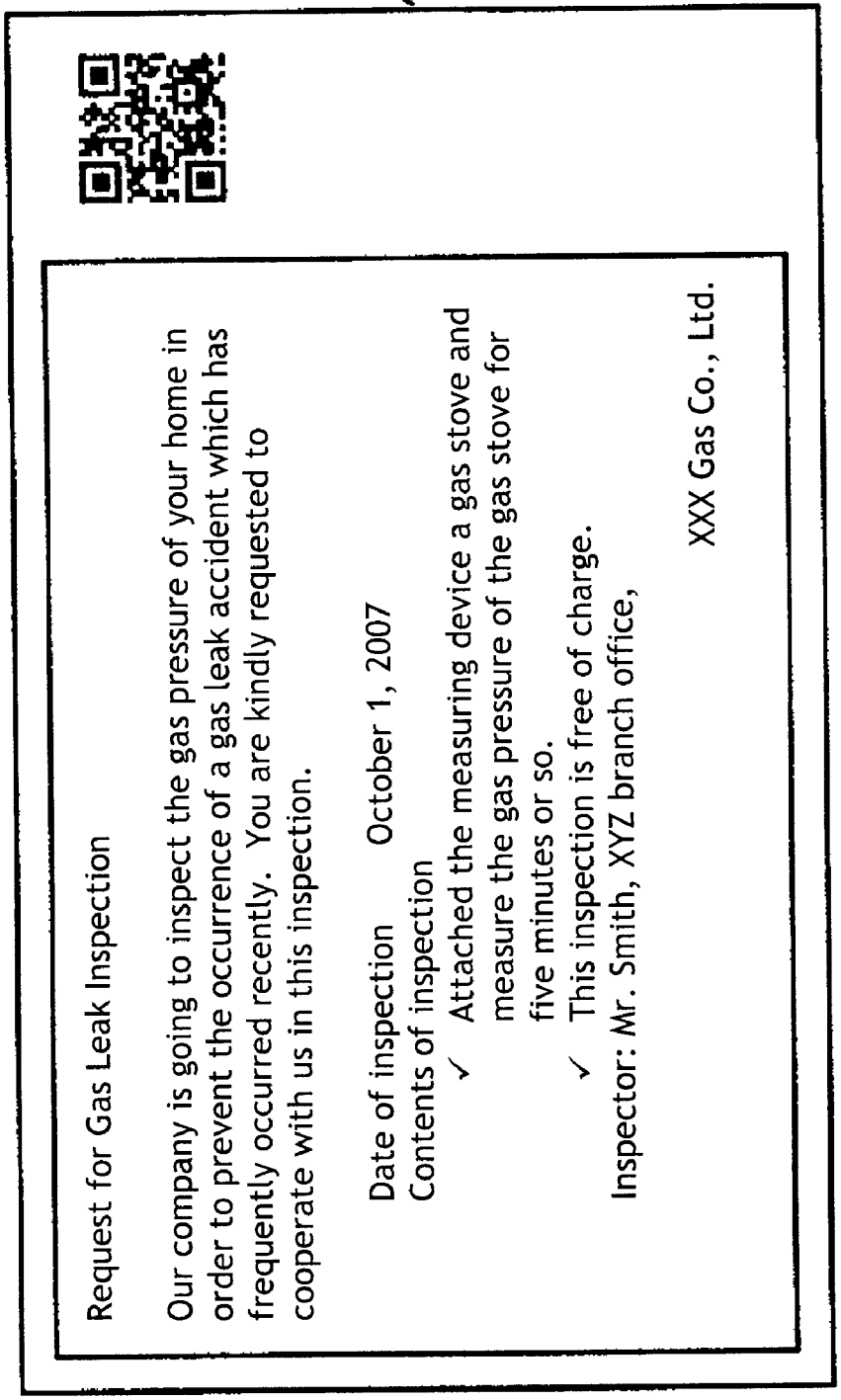
FIGS. 14A and 14B are views showing an example of an approval form including a certificate image when a signature system according to this exemplary embodiment is applied to a home visit.
Figure 14B:
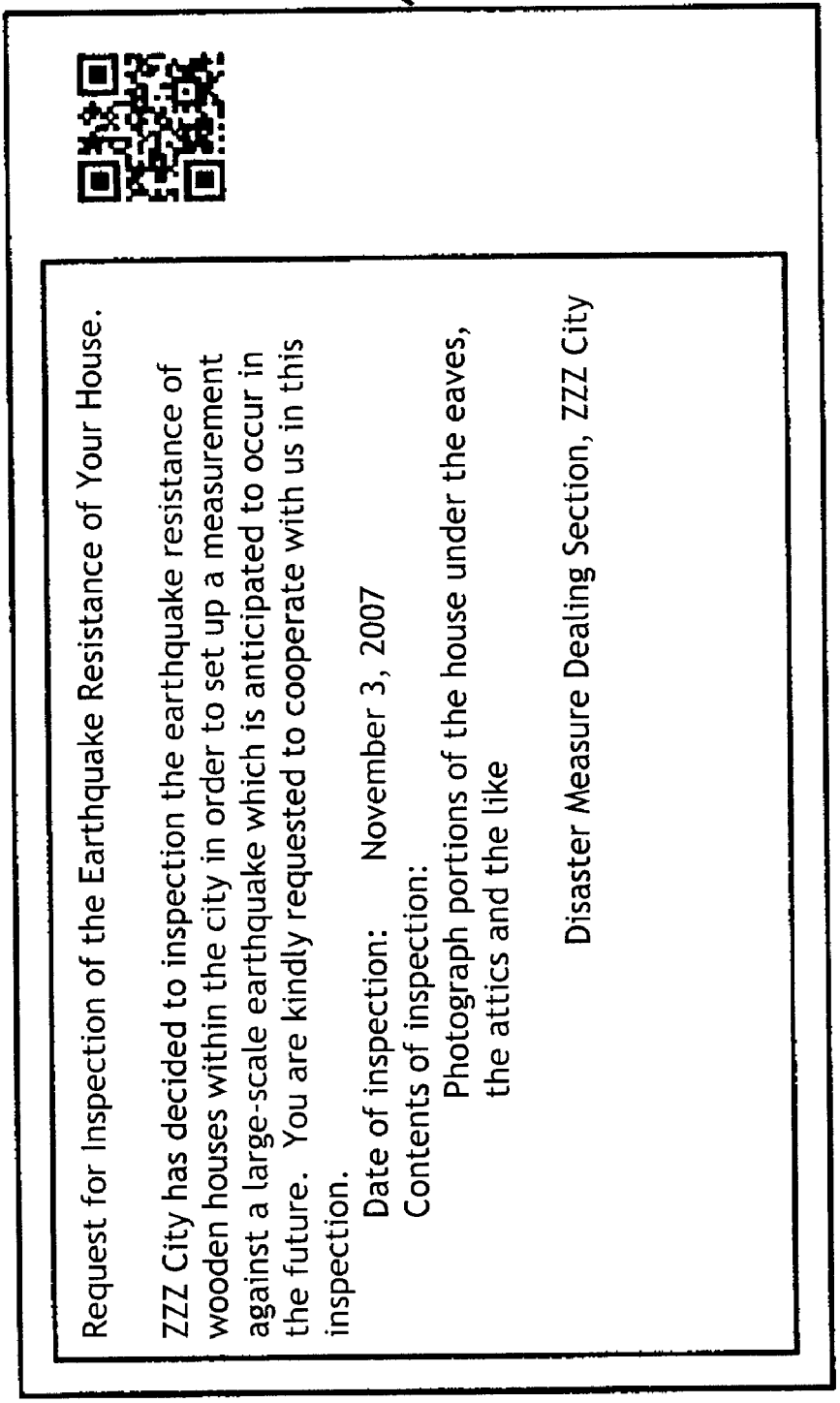

Now, FIGS. 14A and 14B shows an example in which two certificate images 5 respectively generated by the signature apparatus 10 are applied to an approval form which a home visitor carry when visiting homes. Recently, there has been increasing the number of homes which deny the entrance of a strange visitor in order to protect their family from an unauthorized visitor who claims a municipal employee or an employee of an electric power company or a gas company. However, even though an emergency or a serious trouble occurs, which makes it necessary for a person to enter a home really, there may be a case where even an authorized municipal employee is not allowed to enter the home. In view of this, an approval form is prepared using the signature apparatus 10 according to this exemplary embodiment, thereby certifying that a home visit by a person having the approval form is approved as an official visit. That is, the visitor carries the approval form and shows it at a home where he or she visits. The person(s) of the home verifies the signature of the approval form according to a signature verification program installed in the cell phone of the person to thereby confirm whether or not the approval form is authentic.

What is claimed is:

1. An information processing apparatus comprising:
   a processor;
   an image data generating unit, executed on the processor, that generates visually confirmable document image data based on an electronic document to be signed;
   a document image generating unit that generates a document image to be signed including the document image data and error correction data for respective digital character images contained in the document image data;
   a signature generating unit that generates a digital signature of the document image to be signed;
   a code image generating unit that generates a code image based on document-related information and information relating to the document image to be signed, the document-related information including the digital signature of the document image to be signed; and
   a print image generating unit that synthesizes the document image to be signed and the code image to generate a print image.

2. The information processing apparatus according to claim 1, wherein the document image generating unit arranges a first pixel string representing the error correction data in a pixel row direction and a second pixel string representing the error correction data in a pixel column direction to include the first pixel string and the second pixel string in the document image to be signed so that the first pixel string and the second pixel string appear in a vicinity of each character image contained in the document image data.

3. The information processing apparatus according to claim 2, wherein the document image generating unit adds inclination correction data, which is equivalent to at least one pixel, to the respective pixel strings representing the error correction data in the pixel row direction and the pixel column direction.

4. An information processing apparatus comprising:
   a processor;
   a reading unit, executed on the processor, that reads a print image from a medium, wherein
   the print image includes a document image to be signed and a code image,
   the document image to be signed includes document image data, which is generated to be visually confirmable based on an electronic document to be signed, and error correction data of respective character images contained in the document image data, and
   the code image is generated based on information relating to the document image to be signed and document-related information including a digital signature of the document image to be signed;

a restoring unit that restores the document image data included in the document image to be signed, using the error correction data contained in the document image to be signed;

an extracting unit that extracts the document-related information including at least the digital signature of the document image to be signed, from the code image included in the print image; and a signature verification unit that performs signature verification using the document image data restored by the restoring unit and the document image data included in the document image to be signed extracted by the extracting unit.

5. An information processing system comprising:

a first information processing apparatus; and a second information processing apparatus, wherein the first information processing apparatus includes
- a first processor,
- an image data generating unit, executed on the first processor, that generates visually confirmable document image data based on an electronic document to be signed,
- a document image generating unit that generates a document image to be signed including the document image data and error correction data for respective character images contained in the document image data,
- a signature generating unit that generates a digital signature of the document image to be signed,
- a code image generating unit that generates a code image based on information relating to the document image to be signed and document-related information including the digital signature of the document image to be signed, and
- a print image generating unit that synthesizes the document image to be signed and the code image to generate a print image, and the second information processing apparatus includes
- a second processor,
- a reading unit, executed on the second processor, that reads the print image from a medium, the print image including the document image to be signed and the code image,
- a restoring unit that restores the document image data included in the document image to be signed, using the error correction data contained in the document image to be signed,
- an extracting unit that extracts the document-related information including at least the digital signature of the document image to be signed, from the code image included in the print image, and
- a signature verification unit that performs signature verification using the document image data restored by the restoring unit and the document image data included in the document image to be signed extracted by the extracting unit.

6. The information processing system according to claim 5, wherein the document image generating unit arranges a first pixel string representing the error correction data in a pixel row direction and a second pixel string representing the error correction data in a pixel column direction to include the first pixel string and the second pixel string in the document image to be signed so that the first pixel string and the second pixel string appear in a vicinity of each character image contained in the document image data.

7. A non-transitory computer-readable medium storing a program that causes a computer to execute information processing comprising:

generating visually confirmable document image data based on an electronic document to be signed;

generating a document image to be signed including the document image data and error correction data for respective digital character images contained in the document image data;

generating a digital signature of the document image to be signed;

generating a code image based on information relating to the document image to be signed and document-related information including the digital signature of the document image to be signed; and synthesizing the document image to be signed and the code image to generate a print image.

8. The non-transitory computer-readable medium according to claim 7, wherein the generating of the document image arranges a first pixel string representing the error correction data in a pixel row direction and a second pixel string representing the error correction data in a pixel column direction to include the first pixel string and the second pixel string in the document image to be signed so that the first pixel string and the second pixel string appear in a vicinity of each character image contained in the document image data.

9. A non-transitory computer-readable medium storing a program that causes a computer to execute information processing comprising:

reading a print image from a medium, wherein
- the print image includes a document image to be signed and a code image,
- the document image to be signed includes document image data, which is generated to be visually confirmable based on an electronic document to be signed, and error correction data of respective character images contained in the document image data, and
- the code image is generated based on information relating to the document image to be signed and document-related information including a digital signature of the document image to be signed;

restoring the document image data included in the document image to be signed, using the error correction data contained in the document image to be signed;

extracting the document-related information including at least the digital signature of the document image to be signed, from the code image included in the print image; and performing signature verification using the restored document image data and the document image data included in the extracted document image to be signed.

* * * * *